(12) United States Patent
Schneider et al.

(10) Patent No.: US 11,981,221 B2
(45) Date of Patent: May 14, 2024

(54) CONTACT DEVICE, VEHICLE, AND CHARGING STATION

(71) Applicant: SCHUNK TRANSIT SYSTEMS GMBH, Wettenberg (DE)

(72) Inventors: Peter Schneider, Fronhausen (DE); Matthias Domes, Bad Nauheim (DE); Timo Staubach, Herbstein (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 411 days.

(21) Appl. No.: 17/438,989

(22) PCT Filed: Mar. 20, 2019

(86) PCT No.: PCT/EP2019/056976
§ 371 (c)(1),
(2) Date: Sep. 14, 2021

(87) PCT Pub. No.: WO2020/187414
PCT Pub. Date: Sep. 24, 2020

(65) Prior Publication Data
US 2022/0153151 A1   May 19, 2022

(51) Int. Cl.
*B60L 53/16* (2019.01)
*H01R 9/24* (2006.01)
*H01R 41/00* (2006.01)

(52) U.S. Cl.
CPC ............ *B60L 53/16* (2019.02); *H01R 9/2408* (2013.01); *H01R 41/00* (2013.01); *H01R 9/2491* (2013.01); *H01R 2201/26* (2013.01)

(58) Field of Classification Search
None
See application file for complete search history.

(56) References Cited

U.S. PATENT DOCUMENTS

| 9,352,658 | B2 * | 5/2016 | Morris | B60L 53/11 |
| 2017/0166071 | A1 * | 6/2017 | Tajima | B60L 53/35 |
| 2017/0166084 | A1 | 6/2017 | Tajima | |

FOREIGN PATENT DOCUMENTS

| CN | 107933318 A | 4/2018 | |
| CN | 108638892 A * | 10/2018 | B60L 53/16 |
| DE | 202013101624 U1 | 7/2014 | |

(Continued)

*Primary Examiner* — Tho D Ta
(74) *Attorney, Agent, or Firm* — Dickinson Wright PLLC; Andrew D. Dorisio

(57) ABSTRACT

The invention relates to a contact device for being arranged on an electrically driven vehicle, in particular electric bus or the like, or on a charging station for an electrically driven vehicle having at least two contact bar arrangements (10), each comprising one contact bar carrier (11) and at least one contact bar (12) which is disposed on the contact bar carrier and which is electrically connectable to a charging contact of a charging contact carrier of a charging contact device of the charging station or to a contact bar of the vehicle, the contact bar having a connecting device (13) for connecting the contact bar to an electrical conductor (14), which is guidable towards the vehicle or towards the charging station, the connecting device comprising a groove (15), which extends longitudinally in the contact bar, and a connecting element (16), which is attached to the groove, for being connected to the electrical conductor.

17 Claims, 4 Drawing Sheets

(56) References Cited

FOREIGN PATENT DOCUMENTS

| | | | |
|---|---|---|---|
| DE | 102014213831 A1 | 1/2016 | |
| DE | 102017115744 A1 | 1/2019 | |
| DE | 202017107220 U1 | 4/2019 | |
| EP | 2457764 A1 | 5/2012 | |
| EP | 2981432 B1 * | 5/2017 | ......... B60L 11/1816 |
| KR | 101957835 B1 * | 3/2019 | |
| SU | 1261811 A2 | 10/1986 | |

\* cited by examiner

CONTACT DEVICE, VEHICLE, AND CHARGING STATION

TECHNICAL FIELD

The invention relates to a contact device for being arranged on an electrically driven vehicle, in particular electric bus or the like, or on a charging station for an electrically driven vehicle, to an electrically driven vehicle and to a charging station for an electrically driven vehicle, the contact device having at least two contact bar arrangements, the two contact bar arrangements each comprising one contact bar carrier and at least one contact bar, which is disposed on the contact bar carrier and which is electrically connectable to a charging contact of a charging contact carrier of a charging contact device of the charging station or to a contact bar of the vehicle, the contact bar having a connecting device for connecting the contact bar to an electrical conductor, which is guidable towards the vehicle or towards the charging station.

BACKGROUND

Such contact devices, electrically driven vehicles and charging stations are known from the state of the art, contact devices of the make mentioned above typically being used for charging electrically driven vehicles at a bus stop or a stopping point. Electrically driven vehicles used for local transport, such as electric busses, can be continuously supplied with electrical energy via an overhead line, among other things. To take advantage of an electric drive even without an overhead line network, it is known to equip public transport vehicles with batteries or other types of energy storage devices. However, the vehicle can only be operated continuously if the batteries are charged when the vehicle stops at a bus stop. Different contact devices for producing an electrically conductive connection between a stationary charging station in the area of a bus stop and a vehicle or electric bus are known from the state of the art. In the case of an electric bus, a so-called current collector having a contact bar can be disposed on a roof of the electric bus, wherein a rail, which extends longitudinally in the electric bus's moving direction, or a charging contact is suspended above a road in the area of the bus stop. When the electric bus stops at the bus stop, the current collector is moved upwards from the vehicle of the bus to the rail or the charging contact, whereby an electrical connection is produced for the duration of the scheduled stop of the electric bus at the bus stop, such that charging can take place during this time period. It is also known from the state of the art to dispose a contact bar directly on a roof of an electric bus, wherein a positioning device or a rocker having a charging contact disposed thereon is suspended above a road in the area of a bus stop. In this case, the charging contact is moved downward to the contact bar by means of the positioning device or the rocker, such that a corresponding charging can take place.

Furthermore, contact bars can be required for a control line, grounding or a data transfer, for example. Several contact bars are then disposed on a contact device, said contact bars being electrically connectable to a corresponding number of charging contacts, which are disposed in the moving direction of the electric bus and which can be realized as parallel rails, for example. A larger number of contact pairs can thus be produced simultaneously or subject to a specific order. In particular, additionally realized electric connecting line between the stationary charging station and the vehicle, for example for controlling and monitoring a charging process, can thus be used.

In a known contact device, two contact units, which each comprise two contact bar arrangements, are disposed parallel to each other on a roof of an electrically driven vehicles, both contact bar arrangements being disposed behind each other and adjacent to each other within the contact unit. The contact bar arrangements of the contact unit can also be connected to each other. In this case, each contact bar arrangement comprises a contact bar carrier and one contact bar, which is disposed on the contact bar carrier and which is electrically connectable to a charging contact of a charging contact carrier of a charging contact device of a charging station which is suspended above a road in the area of a bus stop. Furthermore, each contact bar has a connecting device for connecting the contact bar to an electrical conductor, such as a cable, which can be guided to the vehicle or to a battery of the vehicle. A screw, which is inserted into a passage of a surface of an upper side of the contact bar or a contact surface of the contact bar, is typically used as a connecting device. This is disadvantageous in the sense that, on the one hand, a screw head protruding beyond the contact surface reduces a quality of a charging current flow, which is generated between the contact bar and the charging contact, or the quality of a power transmission and, on the other hand, the screw head leaves a weld spot-like pattern on the charging contact when connected to the charging contact, thus gradually weakening the material of the charging contact. The quality of the power transmission is thus also reduced further. Additionally, a heating of the screw occurring during a charging process sometimes causes an elongation of the screw, which typically causes the electrical conductor to detach from the contact bar. Furthermore, the connecting device is typically realized such that generally only one electrical conductor having a prespecified cross section of the conductor can be connected to the contact bar, which, not least, causes a limitation of a maximum charging rate and makes a flexible use of the contact device impossible. Thus, simply substituting a conductor, which is connected to the contact bar and which has a cross section, with a conductor having a cross section deviating from said cross section, is not possible. Another disadvantage of this contact device is related to the fact that, in practice, the contact bar only has one passage, such that the conductor cannot be fastened to the contact bar at a freely selectable position.

Furthermore, providing the contact bar with a heating device is known, heating wires being introduced into a cavity of the contact bar below a contact surface of the contact bar in practice. It is problematic that the heating wires are only inserted into the cavity, such that an air gap typically forms between the heating wires and a material of the contact bar.

As a result of this, the heating wires are unable to unfold full heating power.

SUMMARY

Therefore, the object of the present invention is to propose a contact device for being arranged on an electrically driven vehicle, an electrically driven vehicle and a charging station for an electrically driven vehicle, which allow a better power transmission.

This object is attained by a contact device having the features of claim 1, an electrically driven vehicle having the features of claim 15 and a charging station having the features of claim 17.

The contact device according to the invention for being arranged on an electrically driven vehicle, in particular electric bus or the like, or on a charging station for an electrically driven vehicle having at least two contact bar arrangements, the two contact bar arrangements each comprising one contact bar carrier and at least one contact bar, which is disposed on the contact bar carrier and which is electrically connectable to a charging contact of a charging contact carrier of a charging contact device of the charging station or a contact bar of the vehicles, the contact bar having a connecting device for connecting the contact bar to an electrical conductor, which is guidable towards the vehicle or towards the charging station, the connecting device comprising a groove which extends longitudinally in the contact bar and a connecting element, which is attached to the groove, for being connected to the electrical conductor.

Consequently, the connecting device is, in this case, not realized by a screw which is inserted into a passage of a surface of an upper side of the contact bar or a contact surface of the contact bar or the like, instead, the connecting device comprises a groove which extends longitudinally in the contact bar and a connecting element, which is attached to the groove, by means of which the electrical conductor is connected to the contact bar. It is thus possible to fasten the conductor to the contact bar at a freely selectable position, whereby the contact device can be used in a more flexible manner. In this case, the connecting element can be formed according to a shape of the groove and can be connected to the groove in a form-fitting manner, such that the connecting element does not need to be additionally secured. However, it is also conceivable that the connecting element is additionally connected to the groove in a force-fitting manner. Advantageously, the groove extends across an entire length of the contact bar. The connecting element can be at least partly accommodated in the groove. Advantageously, the connecting element can also be made of an electrically conductive material. Overall, this embodiment of the connecting device, on the one hand, allows a quality increase of a power transmission between the contact bar and the charging contact and, on the other hand, avoids the forming of weld spot-like patterns, which weaken the material of the charging contact.

According to a constructively advantageous embodiment of the invention, the groove can be realized as a T-slot. In this case, the connecting element can be securely attached to the groove. A dovetail-shaped groove is also conceivable.

In a specific development of the invention, the connecting element can be realized so as to be moveable along the groove. The connecting element can then be manually moved in the groove. Thus, a position of the connecting element within the groove is freely selectable at all times. It is thus possible to advantageously adjust the position of the connecting element to a guide of the electrical conductor from the vehicle. To reduce friction between the groove and the connecting element, a slip agent or lubricant can also be provided in the groove.

In an embodiment of the invention, the connecting device can have a conductor receptacle which is connected to the connecting element. A cable lug, a clamp or a sleeve can be provided as a conductor receptacle. In particular, the electrical conductor can be securely attached to the contact bar without a screw.

According to an advantageously constructive embodiment of the invention, the conductor receptacle can be detachably connected to the connecting element. The conductor receptacle can then be adapted to a cross section of the electrical conductor. Thus, the contact device can be used in an even more flexible manner.

Two or more connecting elements can also be attached to the groove. In this case, an electrical conductor can be connected to each connecting element, such that a maximum charging rate can be advantageously increased with an increasing number of connecting elements or electrical conductors. This can result in a shortening of a charging time.

Preferably, a lower side of the contact bar has the groove. The groove is then well-protected against external influences, in particular weather-related influences. The groove can also extend longitudinally in a lateral surface of the contact bar, which does not have the contact surface.

In an embodiment of the invention, a surface of an upper side of the contact bar can be realized so as to be sealed against an environment. The upper side of the contact bar is to be understood as a side of the contact bar which has a contact surface, the contact surface being provided for being electrically connected to the charging contact. Advantageously, the contact surface can take up the entire surface of the upper side of the contact bar, thus ensuring a good power transmission. Due to the fact that the surface is realized so as to be sealed, meaning in particular that no screw head protrudes beyond the surface, a quality of the power transmission can be improved further.

In an embodiment of the invention, the contact bar can have a heating device. The heat generated by the heating device can effectively remove a layer of ice, frost or the like from the contact bar, such that even during relatively cool or winter weather conditions, an ideal power transmission can be ensured.

In an advantageous embodiment of the invention, the heating device can be realized by at least one heating wire which is integrated in the groove. The groove can have a recess in which the heating wire can be inserted, in such a manner that the heating wire is at least partly connected to the groove in a form-fitting manner.

In a specific development of the invention, the heating wire can be at least partly, preferably fully, molded into a material which is introduced into the groove. It can thus be achieved that the heating wire abuts on a contact surface of the groove without an air gap between the heating wire and a material of the contact bar, such that the heating wire is able to unfold its full heating power. The material introduced in the groove can be a heat-resistant dielectric material, such as a silicone resin or an epoxy resin.

Particularly preferably, the contact device can comprise two contact units which each comprise two contact bar arrangements. Advantageously, the contact bar arrangements each comprise one contact bar carrier and exactly one contact bar which is disposed on the contact bar carrier. The two contact bar arrangements can be disposed behind each other and adjacent to each other within the contact unit. The contact units can be aligned parallel to each other. Advantageously, the additional contact bars or contact bar carriers can be used for controlling and monitoring a charging process or for grounding or for a data transfer.

The contact bar carriers can be connectable to each other. Screws can be provided for this, for example.

In an embodiment of the invention, the contact bar carrier can have a first supporting structure which is disposed on a first end of the contact bar and a second supporting structure which is disposed on a second end of the contact bar. The first and the second supporting structure can have passages for connecting the supporting structures to the vehicle by means of screws. Furthermore, at least one of the supporting structures can have connections for a heating device of the contact bar, such as heating wires, and for supplying the heating device with power.

In an advantageous embodiment of the invention, connecting device can have a T-slot nut. The connecting element can then be easily attached along the groove in a desired position. The T-slot nut can have a thread, such that the connecting element can be screwed into the T-slot nut by means of a screw.

The above description of the contact device primarily describes the embodiment in which the contact device is disposed on an electrically driven vehicle. Of course, the person skilled in the art will apply all features contained in the description above *mutatis mutandis* to the embodiment in which the contact device is disposed on a charging station for an electrically driven vehicle.

The electrically driven vehicle according to the invention, in particular electric bus or the like, has a contact device according to the invention. The description of advantages of the contact device according to the invention is referred to for advantageous effects of the vehicle according to the invention.

In one embodiment, the contact bar arrangements can be disposed parallel to each other on the vehicle. In this arrangement, a contact bar of a contact bar arrangement is aligned parallel to a contact bar of a different contact bar arrangement.

Further advantageous embodiments of the vehicle are apparent from the description of features of the dependent claims referring back to device claim 1.

The charging station according to the invention for an electrically driven vehicle, in particular electric bus or the like, has a contact device according to the invention. The description of advantages of the charging station according to the invention is referred to for advantageous effects of the contact device according to the invention.

Further advantageous embodiments of the charging station are apparent from the description of features of the dependent claims referring back to device claim 1.

BRIEF DESCRIPTION OF THE DRAWINGS

Hereinafter, a preferred embodiment of the invention will be described in more detail with reference to the accompanying drawings.

DETAILED DESCRIPTION

Figure 1:
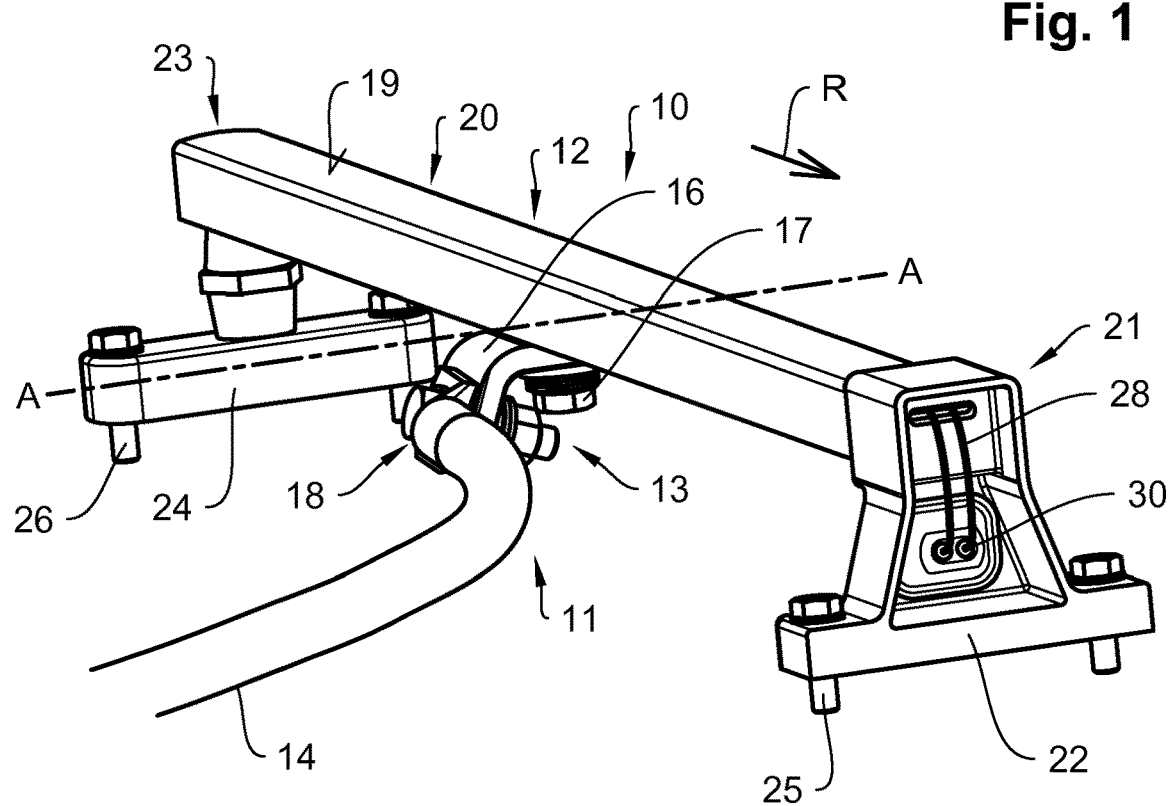
FIG. 1 shows a perspective view of a contact bar arrangement in one embodiment.
Figure 2:
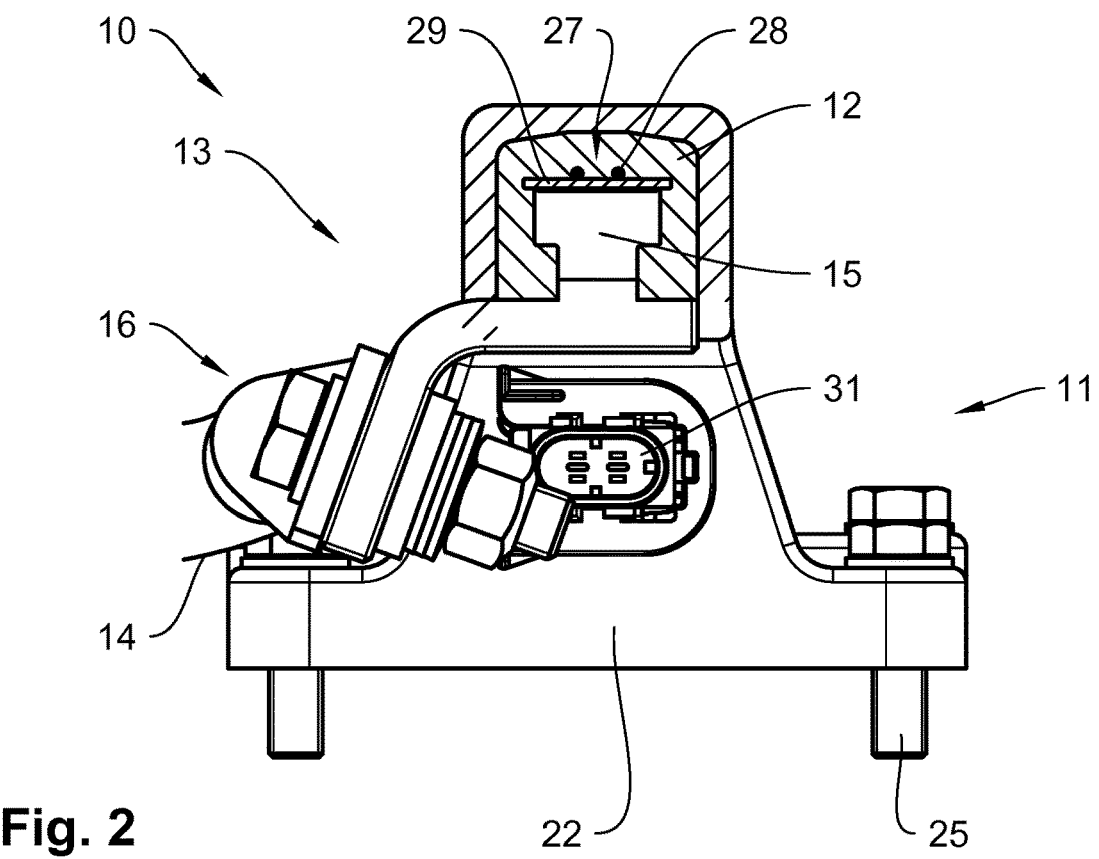
FIG. 2 shows a sectional view of the contact bar arrangement along a line A-A.

A combined view of FIG. 1 and FIG. 2 shows a contact bar arrangement 10 which comprises a contact bar carrier 11 and a contact bar 12 which is disposed on contact bar carrier 11 and which can be electrically connected to a charging contact (not shown). Furthermore, contact bar 12 has a connecting device 13 for connecting contact bar 12 to an electrical conductor 14, which is guidable towards the electrically driven vehicle (not shown). In particular, electrical conductor 14 can be connected to a battery (not shown) of the electrically driven vehicles. Connecting device 13 in turn comprises a groove 15, which extends longitudinally in contact bar 12 and which is realized as a T-slot in this case, and a connecting element 16, which is attached to groove 15, for being connected to electrical conductor 14. Connecting element 16 is realized so as to be moveable along groove 15 and can be secured against a movement or displacement in a random position along grove 15 by means of a screw 17 of connecting device 13 and a T-slot nut (not shown) of connecting device 13. Furthermore, connecting device 13 has a conductor receptacle 18 which is screwed into connecting element 16 and which is realized by a cable lug in this case.

A surface 19 of an upper side 20 of contact bar 12 is realized so as to be sealed against an environment. Contact bar carrier 11 has a first supporting structure 22 which is disposed on a first 21 end of the contact bar 12 and a second supporting structure 24 which is disposed on a second end 23 of the contact bar 12, wherein the supporting structures 22 or 24 can be connected to the vehicle by means of screws 25 or 26. Furthermore, contact bar 12 has a heating device 27, which is realized by a heating wire 28, which is integrated in groove 15. Heating wire 28 is fully molded into a material 29 which is introduced into groove 15. First supporting structure 22 comprises a connection 30 for heating wire 28 and a connection 31, which is realized by a socket, for connecting a cable (not shown) for supplying heating device 27 with power.

FIG. 2 shows a sectional view of contact bar arrangement 10 along a line A-A with a view in a direction R, i.e., in a direction of first supporting structure 22.

Figure 3:
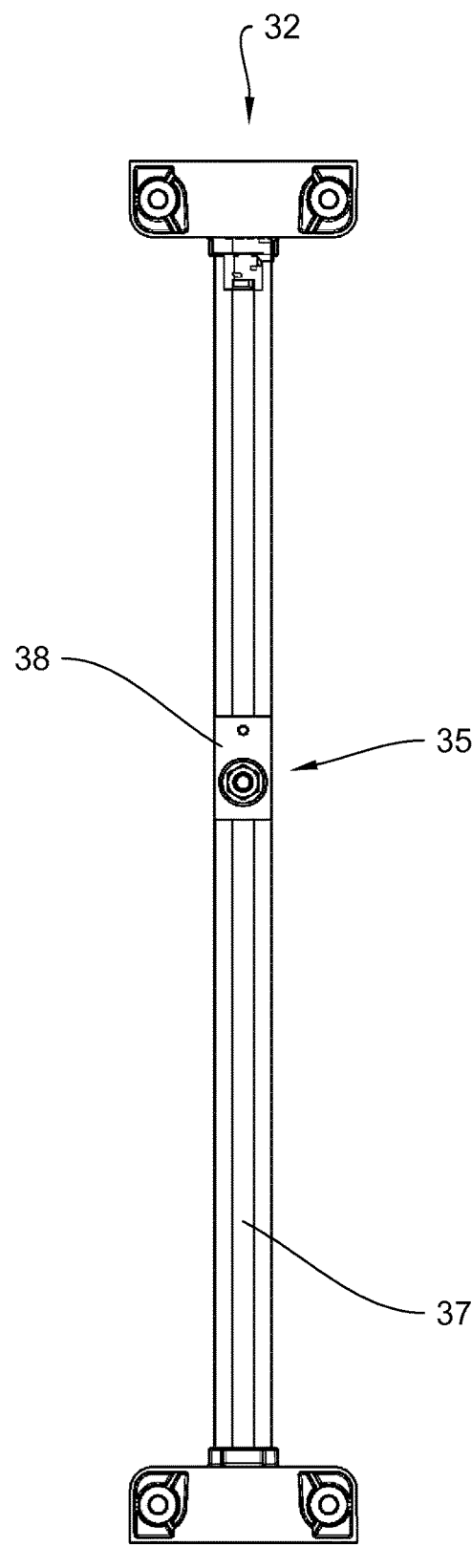
FIG. 3 shows a bottom view of a contact bar arrangement in another embodiment.
Figure 4:
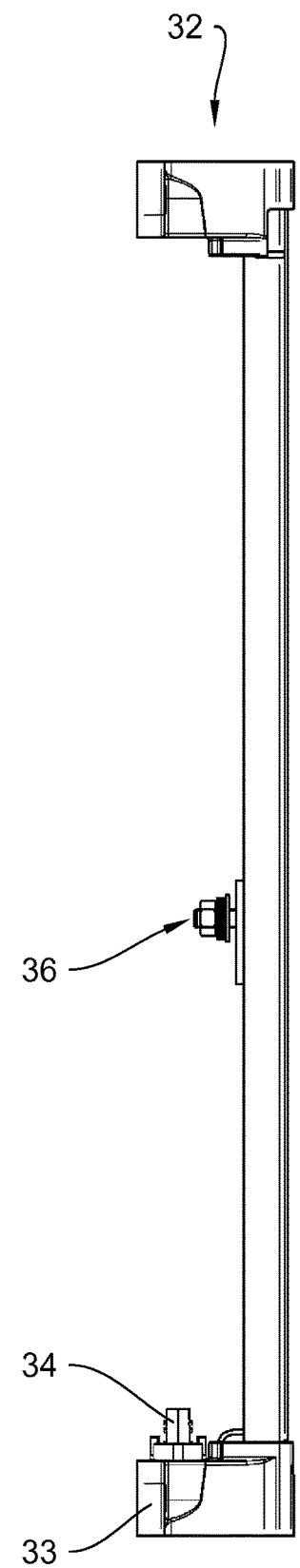
FIG. 4 shows a side view of the contact bar arrangement shown in FIG. 3.

A combined view of FIG. 3 and FIG. 4 shows a contact bar arrangement 32, which essentially matches contact bar arrangement 10. In particular, a first supporting structure 33 having a connection 34 for a cable (not shown) for supplying a heating device (not shown) with power and a connecting device 35 can be seen, wherein a connecting element 38 can be secured along a groove 37 in a random position by means of a screw 36.

Figure 5:
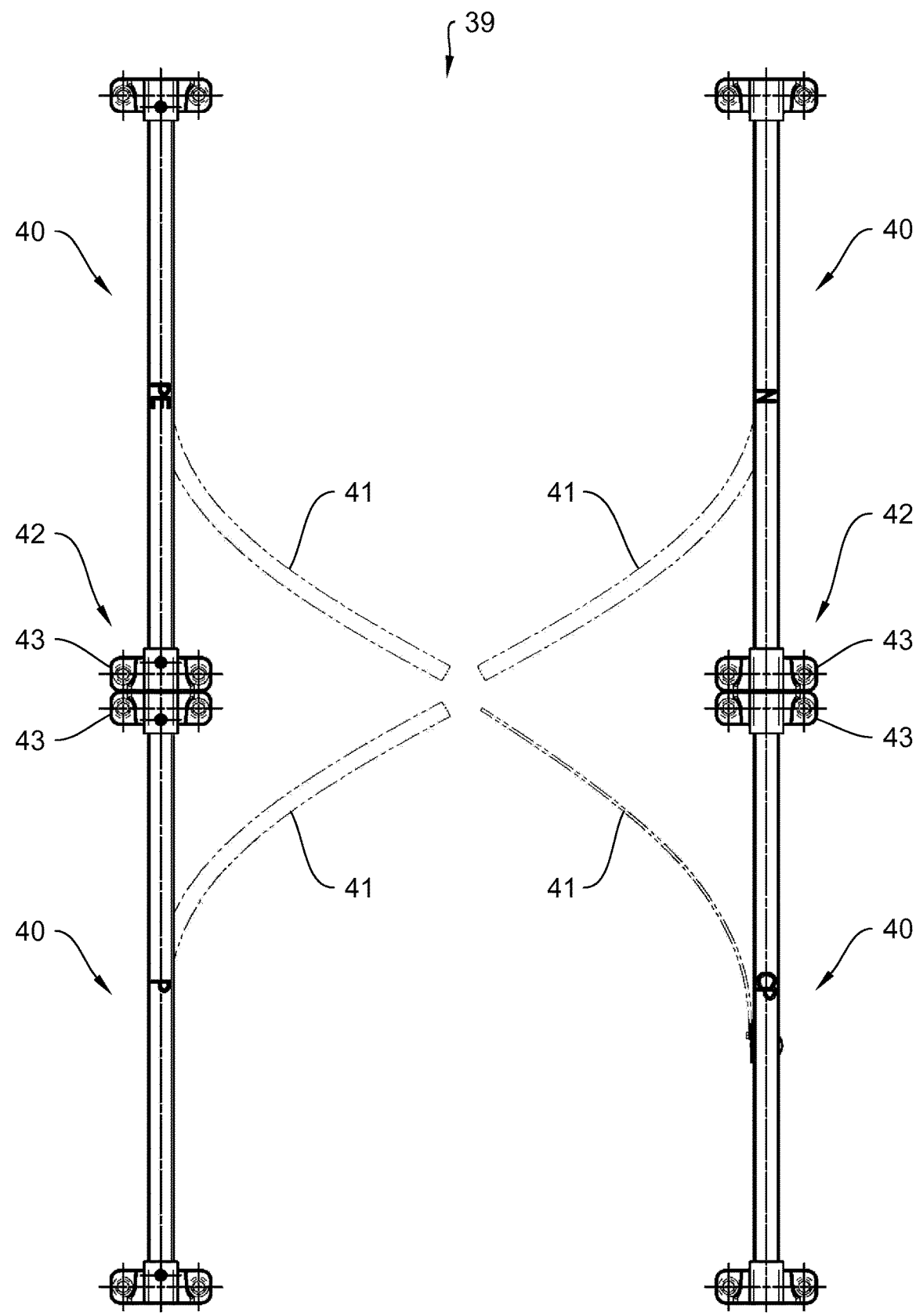
FIG. 5 shows a top view of a contact device.

FIG. 5 shows a contact device 39 which comprises four contact bar arrangements 40. Electrical conductors 41 are connected to contact device 39 by means of a connecting device (not shown). Two contact bar arrangements 40 each are joined to one contact unit 42, contact units 42 being disposed parallel to each other. Within contact units 42, contact bar arrangements 40 are disposed such behind each other that first supporting structures 43 are adjacent to each other or are connected to each other.

Figure 6:
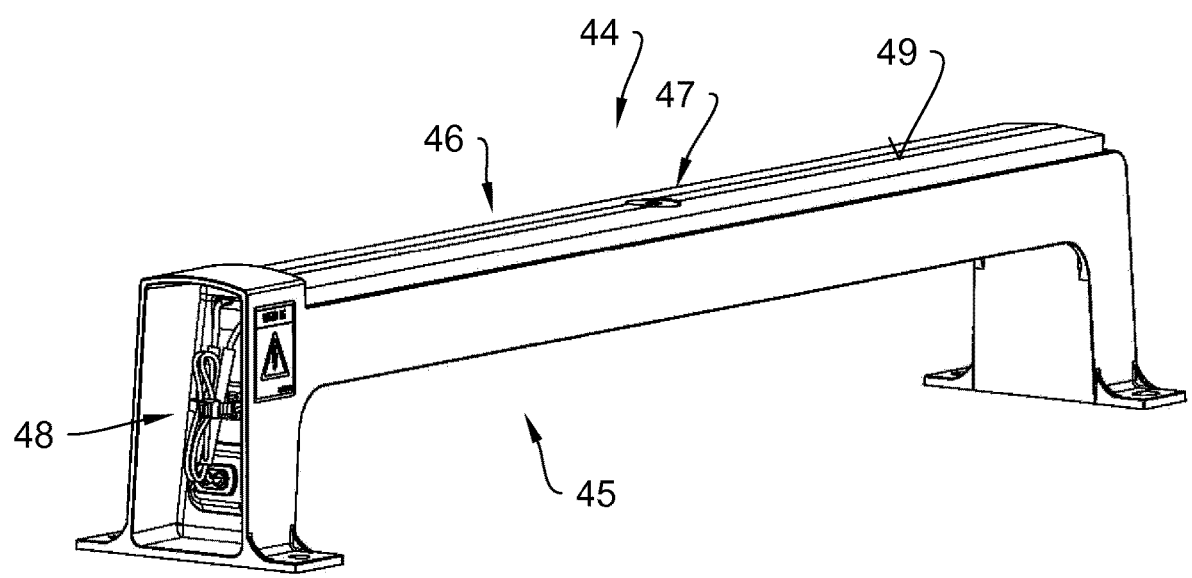
FIG. 6 shows a contact bar arrangement known from the state of the art.

FIG. 6 shows a contact bar arrangement 44 known from the state of the art, comprising a contact bar carrier 45 and a contact bar 46 which has a passage 47. An electrical conductor (not shown) is connected to contact bar 46 by means of a screw (not shown), such that a screw head (not shown) protrudes beyond a contact surface 49 of contact bar 46. Furthermore, contact bar carrier 45 has a heating device 48, a heating wire (not shown in FIG. 6) being inserted into a cavity (not shown), which is located below contact surface 49, of contact bar 46.

The description, the drawings and the claims contain numerous features in combination. The person skilled in the art will also consider the features individually as expedient and combine them in other useful combinations. For example, if a dependent claim referring back to an independent claim, which comprises an entirety of features A, comprises a feature B and a feature C, the person skilled in the art will expediently also consider the combination of features A with the feature B without feature C. In particular, the person skilled in the art will also combine features of different embodiments illustrated in the drawings.

The invention claimed is:

1. A contact device (39) for being arranged on an electrically driven vehicle, or on a charging station for an electrically driven vehicle having at least two contact bar arrangements (10, 32, 40), each comprising one contact bar carrier (11) and at least one contact bar (12) which is disposed on the contact bar carrier and which is electrically connectable to a charging contact of a charging contact carrier of a charging contact device of the charging station or to a contact bar of the vehicle, the contact bar having a connecting device (13, 35) for connecting the contact bar to an electrical conductor (14, 41), which is guidable towards the vehicle or towards the charging station, wherein the connecting device comprises a groove (15, 37), which extends longitudinally in the contact bar, and a connecting element (16, 38), which is attached to the groove, for being connected to the electrical conductor, wherein the connecting element (16, 38) is realized so as to be moveable along the groove (15, 37).

2. The contact device according to claim 1, wherein the groove (15, 37) is realized as a T-slot.

3. The contact device according claim 1, wherein two or more connecting elements (16, 38) are attached to the groove (15, 37).

4. The contact device according to claim 1, wherein a lower side of the contact bar (12) has the groove (15, 37).

5. The contact device according to claim 1, wherein a surface (19) of an upper side (29) of contact bar (12) is realized so as to be sealed against an environment.

6. The contact device according to claim 1, wherein the contact device (39) comprises two contact units (42) which each comprise two contact bar arrangements (10, 32, 40).

7. The contact device according to claim, 1 wherein the contact bar carriers (11) are detachably connectable to each other.

8. The contact device according to claim 1, wherein the contact bar carrier (11) has a first supporting structure (22, 33) which is disposed on a first end (21) of the contact bar (12) and a second supporting structure (24) which is disposed on a second end (23) of the contact bar.

9. The contact device according to claim 1, wherein the connecting device (13, 35) has a T-slot nut.

10. A charging station for an electrically driven vehicle having a contact device (39) according to claim 1.

11. The contact device according to claim 1, wherein the connecting device (13, 35) has a conductor receptacle (18) which is connected to the connecting element (16, 38).

12. The contact device according to claim 11, wherein the conductor receptacle (18) is detachably connected to the connecting element (16, 38).

13. The contact device according to claim 1, wherein the contact bar (12) has a heating device (27).

14. The contact device according to claim 13, wherein the heating device (27) is realized by at least one heating wire (28) which is integrated in the groove (15, 37).

15. The contact device according to claim 14, wherein the heating wire (28) is at least partly, preferably fully, molded into a material (29) which is introduced into the groove (15, 37).

16. An electrically driven vehicle having a contact device (39) according to claim 1.

17. The vehicle according to claim 16, wherein the contact bar arrangements (10, 32, 40) are disposed parallel to each other on the vehicle.

* * * * *